Sept. 25, 1956  F. W. SMERZ  2,763,877
SCREW HEAD ALIGNING DEVICE FOR SCREW SLOTTING MACHINE
Filed Feb. 5, 1953  2 Sheets-Sheet 1

INVETOR
F. W. SMERZ
BY (signature)
ATTORNEY.

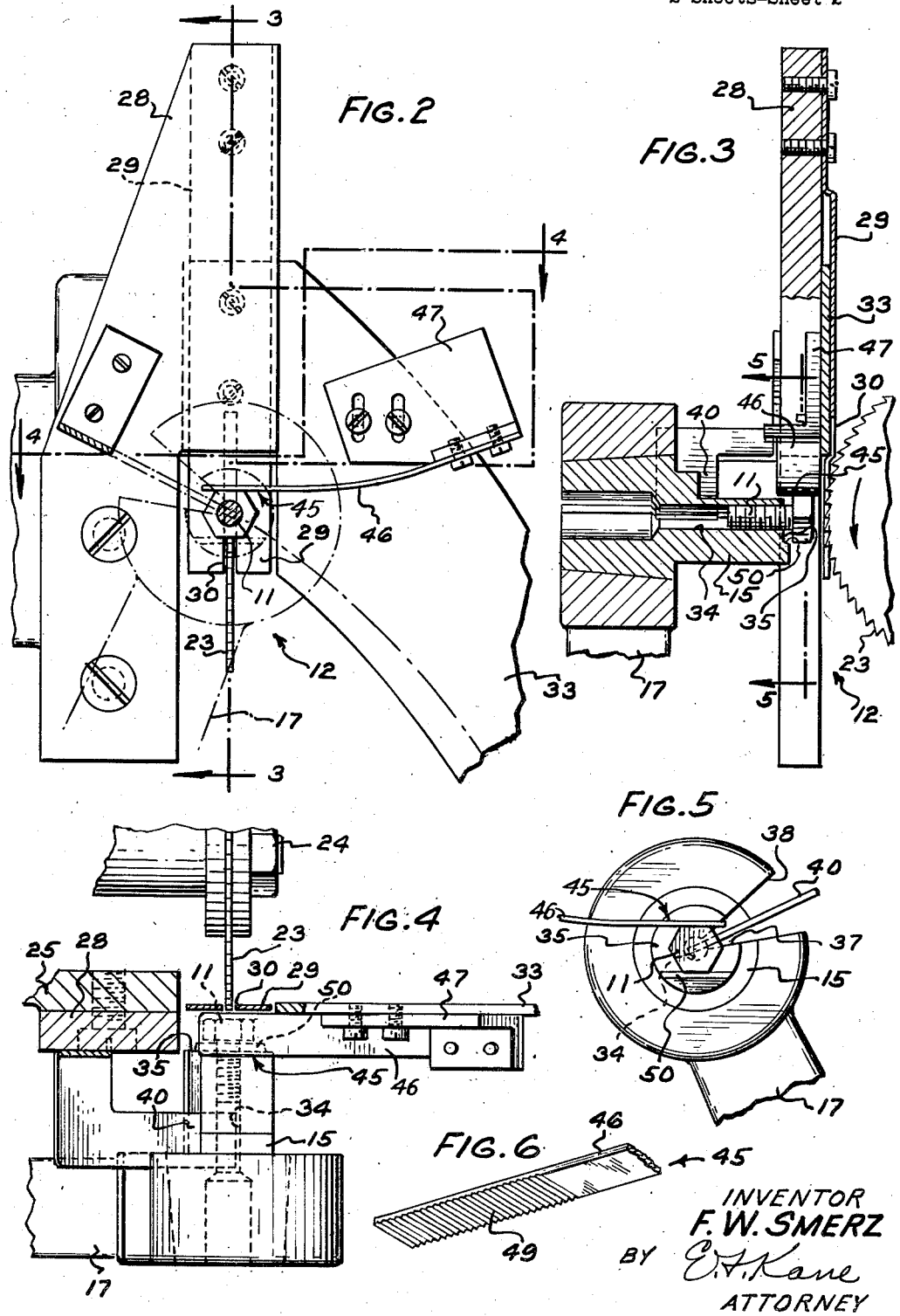

United States Patent Office 2,763,877
Patented Sept. 25, 1956

2,763,877

SCREW HEAD ALIGNING DEVICE FOR SCREW SLOTTING MACHINE

Frank W. Smerz, Riverside, Ill., assignor to Western Electric Company, Incorporated, New York, N. Y., a corporation of New York Application February 5, 1953, Serial No. 335,222

3 Claims. (Cl. 10—5)

This invention relates to a device for aligning screws or other parts in part processing apparatus and more particularly to a device for positioning screws or other parts with the multi-sided heads thereof at a predetermined angular relation to a slotting saw on an automatic screw machine.

It is an object of the present invention to provide a simple aligning device for turning a multi-sided part in a holder to a predetermined angular position.

It is a further object of the invention to provide a simple and effective device for positioning screws with multi-sided heads with the heads thereof in a predetermined angular relation to a slotting tool of a screw slotting device.

A feature of one embodiment of applicant's invention is the provision of an aligning member which has a flat face and is yieldably mounted for swinging movement in a predetermined position in the path of movement of a screw as it is transferred from the screw machine to a slotting position in alignment with a slotting saw, whereby the screw head engages the aligning member and swings it into a second position as the screw moves a short distance relative to the aligning member while in engagement therewith, causing the aligning member to rotate the screw and move a flat face of the screw head into engagement therewith and position the flat sides of the screw head in a predetermined relation to the slotting saw preparatory to cutting a slot in the screw head.

As another feature of the invention, the holder for the screw is provided with a shoulder engageable with a flat side of the screw head after the screw head has been angularly positioned by the movable aligning member and during the axial movement of the holder toward the cutting saw for aiding the aligning member in maintaining said screw in its aligned position during the cutting of the slot in the head of the screw.

Other objects and advantages of the invention will become apparent by reference to the following detailed description and the accompanying drawings illustrating a perferred embodiment thereof, in which:

Fig. 2 is an enlarged fragmentary vertical sectional view of a portion of the mechanism shown in Fig. 1 and with some of the parts in changed position;

Fig. 3 is a vertical cross-sectional view taken on the line 3—3 of Fig. 2;

Fig. 4 is a detailed plan sectional view taken on the line 4—4 of Fig. 2;

Fig. 5 is a detailed vertical sectional view taken on line 5—5 of Fig. 3; and

Fig. 6 is a perspective view of a portion of the aligning member.

Figure 1:
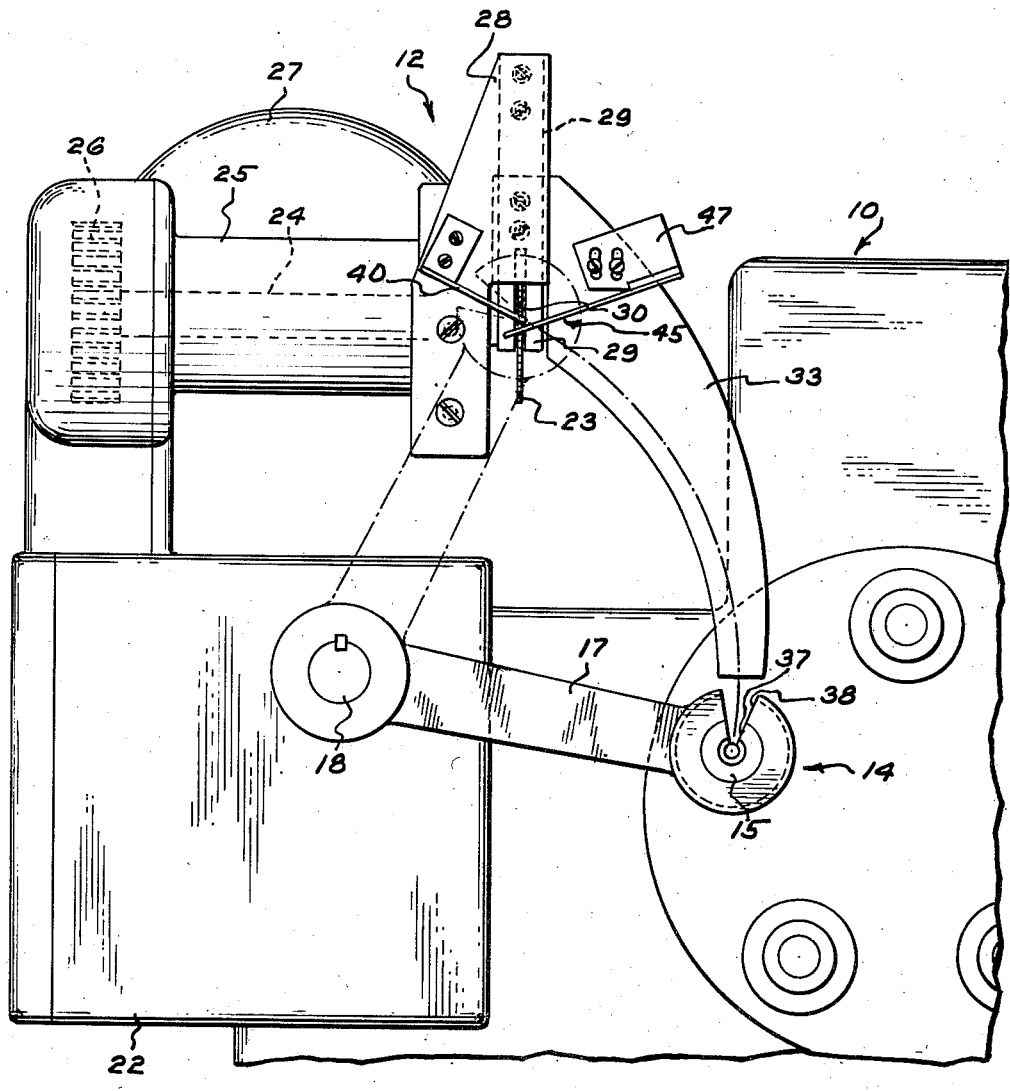
Fig. 1 is an end elevational view of a portion of a screw machine and screw slotting mechanism showing the screw aligning device in position thereon.

Referring to Fig. 1 of the drawings, 10 represents diagrammatically a screw machine for forming screws 11 from rod stock and 12 represents a mechanism for cutting slots in the heads of the screws. The screw machine may be of the single spindle type, but as shown herein is of the multiple spindle turret type having a station 14 at which the completed screw 11 is cut off from the screw stock and is received in a holder 15 in the form of a bushing mounted in the end of a transfer arm 17 fixed to a shaft 18. The shaft 18 is connected by a drive mechanism (not shown) contained within a housing 22 for imparting axial reciprocation and oscillation to the shaft 18, the arm 17, and the holder 15 in a predetermined sequence in timed relation to the actuation of the screw machine to move the screw 11, received at the station 14, through an arcuate path of movement into a slotting position in alignment with a circular saw 23 for cutting a slot in the head of the screw. The saw 23 is mounted on a drive shaft 24 which is journalled for rotation in a housing 25 supported on the screw machine and the shaft is driven through a suitable gear drive 26 from a motor 27.

A plate-like bracket 28 is secured to the housing 25 and has a flat spring 29 secured thereto at its upper end. The lower end of the spring 29, which has a slot 30 aligned with the saw 23 is positioned adjacent the saw 23 for engaging the head of the screw supported in the holder 15 during the forward axial movement of the screw into engagement with the saw for yieldably pressing the screw against the holder 15 during the slotting of the screw and for disengaging the screw from the saw as the holder is retracted on completion of the slot cutting operation. A thin arcuate plate 33 is secured at its upper end to the bracket 28 and serves to retain the screw in the holder 15 during the transfer thereof from the station 14 to its screw slotting position in alignment with the saw 23 as shown in Fig. 2.

The holder or bushing 15, which has a central aperture or bore 34 slightly larger than the threaded shank of the screw 11 for receiving the shank therein and an end face 35 engageable with the head of the screw has an axially extending V-shaped slot 37 therein which is aligned with a similar V-shaped slot 38 in the outer end portion of the lever 17 in which the bushing is secured. The slots 37 and 38 provide clearance for the reception of an ejector member 40 in the form of a flat metal strip secured to the bracket 28 and having an end portion spaced from the bracket and disposed in the bore 34 of the holder 15 and behind the screw 11 when the holder 15 is moved to its operative or slotting position. The end portion of the ejector member 40 engages a screw 11 in the holder 15 after the holder has moved a predetermined distance as it is being retracted after the screw slotting operation and the ejector 40 prevents further movement of the screw axially with the holder while the holder is disengaged therefrom, thereby causing the ejection of the screw from the holder.

The apparatus described thus far is of conventional and well-known construction for forming headed screws from rod stock and forming slots in the screw heads. When the screw heads are round, the screws do not require any special angular alignment of the heads thereof relative to the slotting saw. However, when the screw heads are of the multi-sided or polygonal form, such as square, hexagon, or octagon, it is sometimes desirable to have the slot cut in the heads in a predetermined relation to the sides of the head, for instance at right angles to a pair of the sides of the head intersected by the slots.

To insure that the heads of the screws 11 having multi-sided heads are positioned in a predetermined relation to the slotting saw 23, an aligning member 45 is mounted for swinging movement in the path of movement of the screw for engagement with the head thereof as the screw approaches its slotting position and is moved from a lower position to an upper position by the screw head and in turn rotates the screw head and causes a flat side face of the screw head to engage the aligning member and be positioned thereby in a predetermined alignment relative to the saw 23. The aligning member 45 may be yieldably supported for swinging movement to and from its normal initial position and its final aligning position by any suitable means.

As shown herein, the aligning member 45 is formed on one end of a flat rectangular strip 46 of flexible metal secured at one end to an L-shaped bracket 47 which is fixed to the plate 33. The strip 46 is supported with one edge thereof closely adjacent the plate 33, the spring 29, and the periphery of the saw 23, as shown in Fig. 4, to insure that the aligning member remains in contact with the head of the screw to prevent the screw from turning while it is advanced into engagement with the saw during the slot cutting operation.

In the operation of aligning the head of the screw 11 with the saw 23, the head of the screw engages the lower face of the aligning member 45 as the screw nears the end of its upward arcuate movement and swings the aligning member 45 upwardly and moves along the lower side thereof for a short interval of movement until the screw 11 reaches its slotting position. As the screw head is moved relative to the lower face of the aligning member, the aligning member imparts rotation to the screw head until a flat side of the head is brought into engagement with the flat lower face of the aligning member and slides along said flat surface during any further movement of the screw head without imparting further rotation thereto. Thus, when the screw arrives at its slotting position as shown in Figs. 2 and 3 the left hand portion of the aligning member has been swung to a horizontal position and maintains the upper side face of the screw head which it engages in a horizontal position and at the proper angle relative to the saw 23. The underneath side of the end portion of the aligning member 45, which is engaged by the screw head may be provided with a plurality of transverse grooves 49 or otherwise roughened to provide a roughened surface which will insure sufficient frictional engagement between the underneath side of the aligning member and a corner of adjacent flat faces of the screw head engaged therewith to insure the turning of the screw relative to the aligning member to bring a flat face of the screw head into contact with the lower flat face of the aligning member.

To aid in holding the screw in aligned position after it has been initially brought into a position of angular alignment by the aligning member 45, the holder or bushing 15 is provided with a lug on the forward end face thereof, forming a shoulder 50 (Figs. 3 and 5) against which a flat face of the screw head or the rear edge portion of the face is adapted to engage.

The screw 11, after it has been cut off from the screw stock at the station 14 of the screw machine, is supported in the holder at the station 14 indicated generally in Fig. 3 with the head thereof spaced from the end 35 and the shoulder 50 of the holder so that the screw is free to rotate about its axis in the recess 34 of the holder. After the screw 11 and the holder 15 arrive at the slotting position as shown in Figs. 2 and 3 and as the holder 15 is advanced axially to carry the head of the screw into engagement with the saw, the head of the screw, which has been angularly aligned in a predetermined relation to the cutter by the aligning member 45, is caused momentarily to be held against axial movement by the aligning member 45 and the spring 29 as the holder continues its advancing movement to cause the end 35 and the shoulder 50 to engage the head of the screw and a flat face thereof, respectively, the shoulder 50 serving to hold the screw against rotation while the head thereof is being slotted.

While the aligning member 45 is shown herein as being in the form of a flat rectangular spring metal member yieldably mounted for swinging movement by being flexed to and from its lower and upper positions, it will be obvious that the aligning member 45 may be of another design and otherwise mounted for swinging movement to and from its lower and upper positions.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus having a saw for slotting screws with many sided heads, the combination therewith of a movable holder for supporting a screw for rotation about its axis and for movement through a predetermined path into a slotting position in alignment with the saw, an aligning member having a substantially straight surface engageable with the head of said screw, and means for mounting said aligning member for swinging movement from a normal first position across the path of movement of the head of said screw toward a second position parallel to said path of movement to cause the aligning member in its first position to engage a side of the head of the screw and be moved thereby toward said second position as the screw is advanced to said slotting position, said aligning member serving to impart rotation to said screw and cause the engagement of a flat side face of said screw head with said aligning member as said screw reaches its slotting position for positioning the screw head with said flat face in a predetermined relation to said saw.

2. In an apparatus having a saw for slotting screws with multi-sided heads, the combination therewith of a holder for supporting said part for rotation about its axis and for movement through a predetermined path into a slotting position in alignment with the saw, an elongated flat flexible spring, means engageable with one end of the spring for mounting the spring with the other end thereof in a predetermined normal position in the path of movement of the head of the screw for engagement with a side of the head and for movement by said head to a second position in response to movement of said screw to its slotting position, said other end of the spring being disposed at a predetermined angle relative to said saw in its second position and serving to impart rotation to said screw and cause the engagement of a flat side face of said screw head with said spring as said screw reaches its slotting position.

3. In an apparatus having a saw for slotting screws with many sided heads, the combination therewith of a movable holder for supporting a screw for rotation about its axis and for movement through a predetermined path into a slotting position in alignment with the saw, an aligning member having a roughened substantially straight surface engageable with the head of said screw, and means for mounting said aligning member for oscillatable movement from a normal first position across the path of movement of the head of said screw toward a second position parallel to said path of movement to cause the roughened surface of the aligning member in its first position to be engaged by a side of the head of the screw and be moved thereby toward said second position as the screw is advanced to said slotting position, the roughened surface of said aligning member serving to rotate said screw and engage a flat side face of the screw head as said screw reaches its slotting position to position the screw head with said flat face in a predetermined position relative to the saw.

References Cited in the file of this patent

UNITED STATES PATENTS

| | | |
|---|---|---|
| 246,933 | Worsley | Sept. 13, 1881 |
| 668,180 | Haskins | Feb. 19, 1901 |
| 1,528,940 | Moeller et al. | Mar. 10, 1925 |
| 1,737,208 | Tessky | Nov. 26, 1929 |